United States Patent Office 3,255,253
Patented June 7, 1966

3,255,253
AMINE-CONTAINING POLYOLS
William C. Kuryla, St. Albans, W. Va., assignor to Union
Carbide Corporation, a corporation of New York
No Drawing. Filed July 30, 1962, Ser. No. 213,167
4 Claims. (Cl. 260—584)

The invention relates to a novel class of polyols and to the novel polyurethane products produced therefrom. In a particular aspect, the invention relates to a novel class of tertiary amine-containing polyols, and to the novel polyurethane products which are produced therefrom.

Polyols have become an increasingly useful class of compositions, particularly in the resin arts wherein polyols are used as hardeners for polyepoxide resins, as coreactants with organic polyisocyanates in the preparation of polyurethane products, as coreactants with drying oil fatty acids in the preparation of surface coatings, and the like. The present invention provides a novel class of polyols which have the above utility, as well as novel polyurethane products which are produced from said polyols.

Accordingly, it is an object of the present invention to provide a novel class of polyols.

It is another object of the invention to provide a novel class of polyurethane products which are produced from the novel polyols of the invention.

Still another object of the invention is to provide a novel class of polyurethane foamed reaction products which are produced from the novel polyols of the invention.

Additional objects of the invention will be apparent to those having ordinary skill in the art upon reading the description of the invention which follows.

One or more of the above objects are accomplished by the provision of the novel class of polyols which can be represented by Formula I (I)
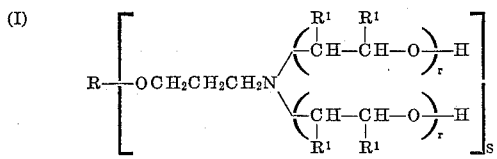

wherein R represents the residue of an alcohol having $s$ alcoholic hydroxyl groups, for example, from 1 to 8 or more alcoholic hydroxyl groups, wherein each $R^1$ individually represents hydrogen or alkyl, preferably lower alkyl of from 1 to 4 carbon atoms, wherein each $r$ individually represents a number having a value of at least 1, and wherein $s$ represents an integer having a value of at least 1, and preferably from 1 to 8.

By "residue of an alcohol" is meant that moiety of the alcohol which remains after removal of the hydroxyl groups. For example, the residue of methanol is a group of the formula $CH_3$—, and the residue of ethylene glycol is a group of the formula —$CH_2CH_2$—.

The polyols of the invention can conveniently be described by reference to a series of reactions which can be employed for their preparation. The first step is the cyanoethylation of an alcohol, which can be illustrated by the following reaction wherein the variables R and $s$ have the meaning stated above with respect to Formula I (a)
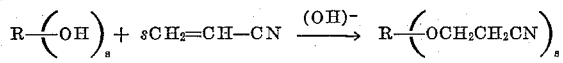

In this reaction, the alcohol is reacted with acrylonitrile in the presence of a basic catalyst.

The second step is the reduction of the cyanoethylated alcohol to produce a primary amine:

(b)
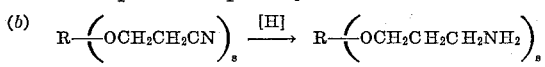

Before hydrogenation, the basic catalyst employed in step (a) is neutralized. The hydrogenation is carried out in conventional equipment in the presence of, for example, a nickel on kieselguhr catalyst. It is also desirable to conduct the hydrogenation in the presence of a small amount (for example, 10 weight percent, based on weight of reaction mixture) of anhydrous ammonia. The hydrogenation can be carried out at an elevated temperature and superatmospheric pressure, for instance, at 110–130° C. and 950–2000 p.s.i.g. pressure. Under these conditions, the hydrogenation reaction takes from about 4 minutes to about 3–4 hours.

The third step is to react an alkylene oxide with the amine product of step (b), which can be illustrated by the following reaction wherein R, $R^1$, $r$, and $s$ have the meaning stated above with respect to Formula I:

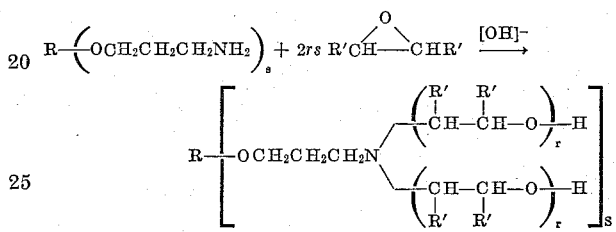

The reaction with alkylene oxide is preferably carried out in the presence of a basic catalyst, for example, potassium hydroxide, in conventional equipment and by conventional procedures.

Among the alcohols, $R(OH)_s$, which can be employed in step (a) in preparing the polyols of the invention, are one or more alcohols from the following classes of compositions:

(a) Mono- and polyhydroxyalkanes and alkylene oxide adducts thereof,
(b) Trialkanolamines and alkylene oxide adducts thereof,
(c) Alcohols derived from mono- and polyamines by addition of alkylene oxides,
(d) Non-reducing sugars and sugar derivatives and alkylene oxide adducts thereof,
(e) Mono- and polyphenols and alkylene oxide adducts thereof,
(f) Polytetramethylene glycols, and the like.

Illustrative mono- and polyhydroxyalkanes which can be employed are, among others, methanol, ethanol, isopropanol, n-propanol, the butanols, the pentanols, the hexanols, the heptanols, 2-ethylhexanol and other octanols, the nonanols, the decanols, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified mono- and polyhydroxyalkanes can also be employed, preferably the ethylene oxide, propylene oxide, the epoxybutanes, or mixtures thereof, adducts of said mono- or polyhydroxyalkanes. When a mono- or a polyhydroxyalkane is employed as the starting alcohol in step (a), the variable R in Formula I supra, is a group of the formula $C_nH_{2n+2-t}$— wherein $n$ is an integer having a value of from 1 to 10, and wherein $t$ is an integer having a value of from 1 to 6 and represents the number of alcoholic hydroxyl groups in the alcohol, provided that $t$ is never an integer greater than $n$. When an alkylene oxide adduct of a mono- or polyhydroxyalkane is employed as the starting alcohol in step (a), R in Formula I supra, is a group of the formula

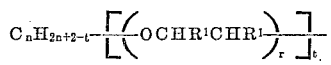

wherein $n$ is an integer having a value of from 1 to 10, wherein $t$ is an integer having a value of from 1 to 6, provided that $t$ is never an integer greater than $n$, wherein $R^1$ is hydrogen or alkyl, preferably alkyl of from 1 to 4 carbon atoms, and wherein $r$ is a number having a value of at least 1. Accordingly, the polyols of the invention can be represented by the formula set forth below, when such alkylene oxide adduct of a mono- or polyhydroxyalkane is employed as the starter alcohol:

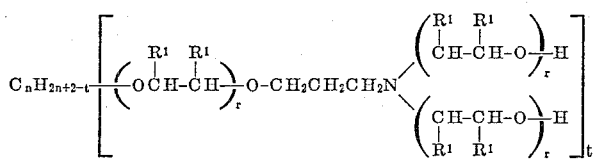

wherein the variables $r$, $n$, $t$, and $R^1$ have the meaning stated above.

Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes.

The preferred class of alkylene oxide adducts of dihydroxyalkanes contemplated are the polyoxyalkylene glycols, such as diethylene glycol, triethylene glycol, tetraethylene glycol, dipropylene glycol, tripropylene glycol, tetrapropylene glycol, dibutylene glycol, high molecular weight polyoxyethylene glycols, high molecular weight polyoxypropylene glycols, mixed ethylene-propylene glycols, mixed polyoxyethylene-polyoxypropylene glycols, and the like. When such preferred poloxyalkylene glycol is employed as the starter alcohol in step (a), R in Formula I supra, is a group of the formula -(alkylenepolyoxyalkylene)- wherein the alkylene moieties thereof have from 2 to 4 carbon atoms. In the case wherein a polyoxyalkylene glycol is employed as the starter alcohol in step (a) supra, the polyols of the invention can be represented by the formula

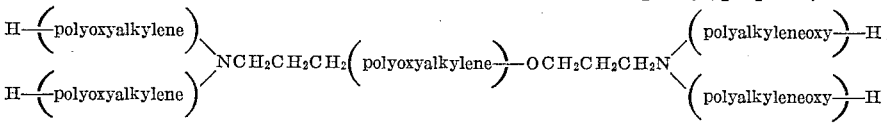

wherein the alkylene moieties thereof have from 2 to 4 carbon atoms.

When such alkylene oxide adducts of trihydroxyalkanes are employed as the starting alcohol in step (a), R in Formula I supra is a group of the formula $C_nH_{2n-1}$(polyoxyalkylene)$_3$ wherein the oxyalkylene moieties have from 2 to 4 carbon atoms, and wherein $n$ is a number having a value of from 3 to 6. When an alkylene oxide adduct of a trihydroxyalkane is employed as the starter alcohol, the polyols of the invention can be represented by the formula

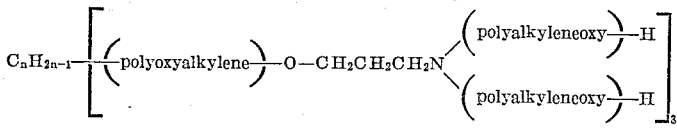

wherein $n$ represents an integer having a value in the range of from 3 to 6, and wherein the alkylene moieties of said polyol have from 2 to 4 carbon atoms.

Another useful class of alcohols which can be employed as the starting alcohols in step (a) in the preparation of the polyols of the invention are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of alcohols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamines, naphthalenediamines, and the like. Among the compounds of the above groups which are of particular interest are, among others, N,N,N',N' - tetrakis(2 - hydroxyethyl)ethylenediamine, N,N,N',N' - tetrakis(2 - hydroxypropyl)ethylenediamine, N,N,N',N'',N''-pentakis(2-hydroxypropyl)diethylenetriamine, phenyldiisopropanolamine and higher alkylene oxide adducts of aniline, and the like.

A further class of alcohols which can be employed as the starting alcohol in step (a) supra are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like.

A still further useful class of alcohols are the mono- and polyphenols, and preferably the alkylene oxide adducts thereof wherein the alkylene oxides have from 2 to 4 carbon atoms. Among the mono- and polyphenols which are contemplated are found, for example, phenol, the cresols, and other alkylphenols, bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)-ethanes, and the like.

Another useful class of polyols are the polytetramethylene glycols, which are prepared by polymerizing tetrahydrofuran in the presence of an acidic or a basic catalyst.

From the above-exemplified list of alcohols, it is seen that a great many alcohols can be employed as the starter in the preparation of the amines used in the invention. Although virtually any alcohol can be used, it is in general preferred to employ alcohols having up to about 8 or more alcoholic hydroxyl groups. It is also desirable that the alcohol be substantially free of ethylenic and acetylenic unsaturation and also that the alcohol be substantially free of non-hydrocarbon moieties other than tertiary amino nitrogen, ether oxygen, and alcoholic hydroxyl. Where the alcohol employed is a high molecular weight alcohol, for example an alkylene oxide adduct of an amine or monomeric alcohol, it is preferred that the molecular weight of the alcohol be less than about 10,000, preferably less than about 6000, and more preferably less than about 3500.

The alcohol exemplified above is first cyanoethylated by reacting with acrylonitrile, the cyanoethylated alcohol is then reduced to the corresponding primary amine, and the amine is then reacted with an alkylene oxide to produce the polyols of the invention. The alkylene oxides which can be used for this purpose are the vicinal epoxyalkanes which preferably have up to about 10 carbon atoms. Illustrative alkylene oxides include, for example, ethylene oxide, propylene oxide, 1,2-epoxybutane, isobutylene oxide, the epoxypentanes, the epoxyhexanes, the epoxyheptanes, the epoxyoctanes, the epoxynonanes, the epoxydecanes, styrene oxide, and the like. More preferred are the alkylene oxides which have from 2 to 4 carbon atoms such as ethylene oxide, propylene oxide, 1,2-epoxybutane, 2,3-epoxybutane, isobutylene oxide, and the like.

The polyols of the invention can range from low molecular weight compounds up to compositions having very high molecular weights. The molecular weight of the polyol is most conveniently expressed in terms of hydroxyl number. In general, the hydroxyl numbers of the polyols of the invention can range from about 20, and lower, to about 700, and higher, preferably, from about 30 to about 450, and more preferably, from about 35 to about 250. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{m.w.}$$

where $OH$ = hydroxyl number of the polyol
$f$ = functionality, that is, average number of hydroxyl groups per molecule of polyol
m.w. = molecular weight of the polyol.

Thus the variable $r$ in Formula I supra is a number having a value of at least 1 and such that the polyol has a hydroxyl number within the limits stated above.

In another aspect, the invention provides polyurethane products which are prepared by reacting one or more of the polyols of the invention with an organic polyisocyanate. The resulting polyurethane polymer comprises a molecular network in which the polyol residues are connected to organic polyisocyanate residues by means of urethane groups. The said network may also be modified by the presence of ureylene linkages if water and/or primary or secondary amines are also present in the reaction mixture.

Among the organic polyisocyanates which can be employed to prepare the polyurethane products of the invention are found, for example, 2,4- and 2,6-tolylene diisocyanate, durylene diisocyanate, bis(4-isocyanatophenyl)methane, 4,4',4'' - tris(isocyanatophenyl)methane, hexamethylene diisocyanate, xylylene diisocyanates, 3,10-diisocyanatotricyclo[5.2.1.0$^{2,6}$]decane, and polyisocyanates listed in the publication of Siefken, Annalen, 562, pages 122–135 (1949). Further polyisocyanates of particular interest are those obtained by reacting aromatic amines with formaldehyde and phosgenation of the resulting condensation products as set forth in U.S. Patents 2,683,730 and 3,012,008. The preferred organic polyisocyanates are the tolylene diisocyanates.

It is also within the scope of the invention to use polyisocyanate dimers, trimers, or polymers of the above-mentioned polyisocyanates. Such products can be prepared separately by procedures known in the art or they can be formed in situ during the polymerization reaction of the polyisocyanate with the polyol by proper choice of catalysts known to catalyze dimerization, trimerization, or polymerization, for example, potassium laurate.

If desired, one or more other polyols can be employed in conjunction with the polyols of the invention in the preparation of polyurethane products. Such other polyols may include one or more polyols from the following classes of compositions:

(a) Polyhydroxyalkanes and alkylene oxide adducts thereof,
(b) Trialkanolamines and alkylene oxide adducts thereof,
(c) Polyoxyalkylene glycols,
(d) Polyols derived from mono- and polyamines by addition of alkylene oxides,
(e) Alkylene oxide adducts of polyphenols,
(f) Alkylene oxide adducts of non-reducing sugars and sugar derivatives,
(g) Polytetramethylene glycols, and the like.

The above-identified classes of polyols (a) through (g) were described and illustrated hereinabove under the discussion of the starter alcohols employed in step (a) of the exemplified process for the production of the novel polyols of the invention. The preferred additive polyols are the polyoxyalkylene glycols and the alkylene oxide adducts of polyhydroxyalkanes. The exact polyol employed depends upon the end-use of the modified polyurethane product. For example, in the case of foamed reaction products, the molecular weight or the hydroxyl number is selected properly to result in flexible, semi-flexible, or rigid foams. The above polyols preferably possess a hydroxyl number of from about 200 to about 1000 when employed in rigid foam formulations, from about 50 to about 150 for semi-flexible foams, and from about 40 to about 70 or more when employed in flexible foam formulations. Such limits are not intended to be restrictive, but are merely illustrative of the large number of possible combinations of the above polyol coreactants. The above-exemplified additive polyol can be employed in amounts of, for example, up to about 98 weight percent, and higher, of the polyol portion of the polyurethane formulation.

The amount of organic polyisocyanate employed is dependent, in part, upon such factors as the nature of the reactants, the nature of the end-use for the polyurethane product, and the like. In general, however, the total isocyanate equivalent to total reactive hydrogen equivalent (i.e., total equivalent of alcoholic hydroxyl plus water, if water is employed in the formulation) is ordinarily such as to provide enough isocyanate equivalents to react with all reactive hydrogen equivalents present. Preferably, the ratio of isocyanate equivalents to reactive hydrogen equivalents is about 1.0 to 1.1 —NCO equivalents per reactive hydrogen equivalent.

The polyurethane products can be utilized in the form of surface coatings, elastomers, foamed products, or the like. When surface coatings are being prepared, either the quasi-prepolymer or the prepolymer technique is usually employed to prepare the polyurethane product. When elastomers are being prepared, the quasi-prepolymer technique is preferred, and when foamed products are being prepared, either the one-shot or the quasi-prepolymer technique can be employed. Each of these techniques is known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. These blowing agents include, for example, trichloromonofluoromethane,
dichlorodifluoromethane,
dichloromonofluoromethane, dichloromethane,
trichloromethane,
bromotrifluoromethane,
chlorodifluoromethane,
chloromethane,
1,1-dichloro-1-fluoroethane,
1,1-difluoro-1,2,3-trichloroethane,
chloropentafluoroethane,
1-chloro-1-fluoroethane,
1-chloro-2-fluoroethane,
1,1,2-trichloro-1,2,2-trifluoroethane,
1,1,1-trichloro-2,2,2-trifluoroethane,
2-chloro-1,1,1,2,3,3,4,4,4-nonafluorobutane,
hexafluorocyclobutene, and
octafluorocyclobutane.

Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethylamine, triethylamine, N-methylmorpholine, N-ethylmorpholine, N,N-dimethylbenzylamine, N,N-dimethylethanolamine, N,N,N',N' - tetramethyl - 1,3 - butanediamine, triethanolamine, 1,4 - diazabicyclo[2.2.2]octane, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis - acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)-alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-dimethylaminobenzoate), dibutyltin - bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hyroxide, tributyltin hydroxide, trioctyltin hydroxide, dibutyltin oxide, dioctyltin oxide, dilauryltin oxide, dibutyltin - bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

It is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

The polyols of the invention have wide utility. For example, in addition to their use in the preparation of polyurethane products, the novel polyols can be used as hardeners for polyepoxide resins. The polyols can be used to esterify drying oil acids in the production of surface coating compositions. The novel polyols can further by esterified with various organic monocarboxylic acids to prepare esters useful as plasticizers. The polyurethane compositions of the invention can be used in surface coating applications, in making elastomers, in preparing rigid, semi-flexible, and flexible foams of known utility, and the like.

The examples which follow illustrate various aspects of the invention.

*Example 1*

A polyol was prepared by reacting 1,2-epoxypropane with an amine produced by the cyanoethylation and subsequent reduction of the 1,2-epoxypropane adduct of glycerol, said adduct having a hydroxyl number of about 56. A charge of 2500 grams of the above-described amine and 20 grams of potassium hydroxide was added to a 2-gallon stainless steel autoclave equipped with a circulating pump, automatic controller to regulate jacket steam and water, and another automatic controller to regulate the 1,2-epoxypropane feed. After charging the catalyst and amine, the autoclave was sealed, purged with nitrogen, and the contents were heated to 100° C. 1,2-epoxypropane (5800 grams) was then fed to the autoclave at a rate sufficient to maintain the temperature at 110° C. at an internal pressure of 45 p.s.i.g. The addition took 10 hours. At the completion of the addition, the autoclave temperature was adjusted to 100° C. and was maintained at that temperature until the internal pressure decreased to a minimum value (about 5 p.s.i.g.) which remained constant for 2 hours. The total reaction time was about 12 hours.

The crude polyol product was then refined by agitating with 2 weight percent synthetic magnesium silicate. This treatment was continued for 2 hours at 90° C. under a nitrogen atmosphere, and for an additional 4 hours at 90° C. under a vacuum (about 5 millimeters of mercury absolute pressure). The polyol product was recovered by filtration.

The polyol was a liquid having a viscosity of 1028 centipoises at 25° C. and a color of 4.5 Gardner. The hydroxyl number was about 40.8, and the pH in 10:6 (by volume) isopropanol-water was 11.1.

*Examples 2–9*

By procedures analogous to that described in Example 1, a series of polyols were prepared. Table I below describes the starting alcohols which were cyanoethylated and then reduced to the corresponding amines, as well as the polyol products which resulted from reaction of said amines with the indicated alkylene oxides.

TABLE II.—POLYURETHANE FOAMS

| Weight percent of Example 6 in 1,2-epoxypropane adduct of glycerol | 0 | 5 | 10 | 20 | 50 |
|---|---|---|---|---|---|
| Foam Density, lbs./ft.³ | 1.87 | 1.86 | 1.83 | 1.90 | 1.87 |
| 4-inch ILD lbs./50 inch ²: | | | | | |
| 25% | 31.0 | 36.8 | 34.0 | 38.2 | 39.2 |
| 50% | 47.8 | 51.2 | 51.9 | 58.1 | 58.1 |
| 65% | 60.5 | 68.8 | 70.5 | 78.3 | 78.0 |

The foregoing examples serve to illustrate the practice of the invention. Variations can be made without departing from the spirit and scope of the invention.

What is claimed is:

1. A polyol having a hydroxyl number of from about 35 to about 250, said polyol being of the formula

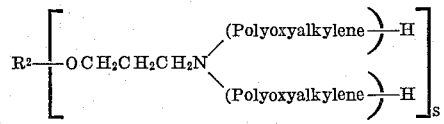

wherein $R^2$ represents the residue of an alcohol having $s$ alcoholic hydroxyl groups, said alcohol being selected from the group consisting of alkanols and alkylene oxide adducts thereof, polyhydroxyalkanes and alkylene oxide

TABLE I.—DESCRIPTION OF POLYOLS

| Example | Starting-Alcohol | Alkylene Oxide | Hydroxyl Number of Polyol | Molecular Weight of Polyol |
|---|---|---|---|---|
| 2 | Polyoxypropylene glycol, molecular weight about 2,025. | 1,2-epoxypropane | 45.4 | 4,950 |
| 3 | Polyoxypropylene glycol, molecular weight about 1,000. | do | 75.2 | 2,975 |
| 4 | Polyoxypropylene glycol, molecular weight about 2,025. | Ethylene oxide plus 1,2-epoxypropane. | 47.8 | 4,705 |
| 5 | 1,2-epoxypropane adduct of glycerol, hydroxyl number about 56. | Ethylene oxide | 80.2 | 4,135 |
| 6 | 1,2-epoxypropane adduct of 1,2,6-hexanetriol, hydroxyl number about 100. | 1,2-epoxypropane | 37.7 | 8,970 |
| 7 | 1,2-epoxypropane adduct of glycerol, hydroxyl number 56. | do | 86.4 | 3,891 |
| 8 | Diethylene glycol | do | 57.7 | 3,888 |
| 9 | Polyoxypropylene glycol, molecular weight about 1,000. | 1,2-epoxybutane | 156.5 | 1,435 |

*Example 10*

A series of flexible polyurethane foams were prepared by the one-shot technique from the following formulation:

| Component: | Parts by weight |
|---|---|
| Total polyol | 100 |
| Tolylene diisocyanate, 3% excess. | |
| N,N,N',N'-tetramethyl-1,3-butanediamine | 0.1 |
| Silicone emulsifier L–520 ¹ | 1.0 |
| Water | 3.5 |
| Stannous octoate | 0.3 |

¹ A polysiloxane-polyoxyalkylene block copolymer produced in accordance with the disclosure of U.S. Patent No. 2,834,748.

The polyol employed was a 1,2-epoxypropane adduct of glycerol, said adduct having a hydroxyl number of 56, with the percentages of said polyol indicated in Table II below replaced with the polyol described above in Example 6.

The flexible foams prepared were evaluated by the standard 4-inch ILD (internal load deflection) test. In this test, a 4-inch thick by 13-inch square specimen of foam is compressed with a circular plate having an area of 50 square inches, and the force required to compress the foam 25 percent, 50 percent, and 65 percent of the original thickness is measured.

Table II, which follows, indicates the polyol used in the foam and the results of the 4-inch ILD tests.

adducts thereof, trialkanolamines and alkylene oxide adducts thereof, alkylene oxide adducts of amines, surcose and alkylene oxide adducts thereof; glycosides and alkylene oxide adducts thereof, phenols and alkylene oxide adducts thereof, polyphenols and alkylene oxide adducts thereof, and polytetramethylene glycols; wherein $s$ represents an integer having a value of from 1 to 8, and wherein the alkylene moieties of said polyol have from 2 to 4 carbon atoms.

2. A polyol of the formula

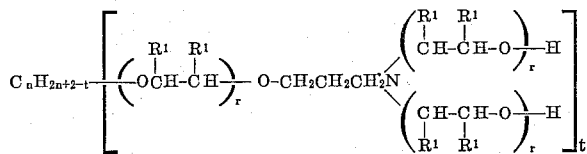

wherein $n$ represents an integer having a value of from 1 to 10, wherein $t$ represents an integer having a value of from 1 to 6 provided that $t$ is never an integer greater than $n$, wherein each $R^1$ individually represents a member of the group consisting of hydrogen and alkyl, and wherein each $r$ individually represents a number having a value of at least 1 and such that the hydroxyl number of said polyol is from about 35 to about 250.

3. A polyol of the formula

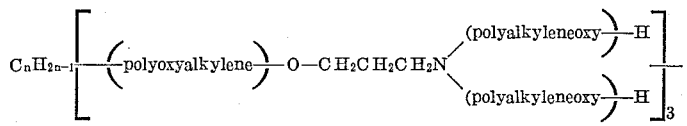

wherein $n$ represents an integer an integer having a value of from 3 to 6, and wherein the alkylene moieties thereof have from 2 to 4 carbon atoms, the said polyol having a hydroxyl number of from about 35 to about 250.

4. A polyol of the formula

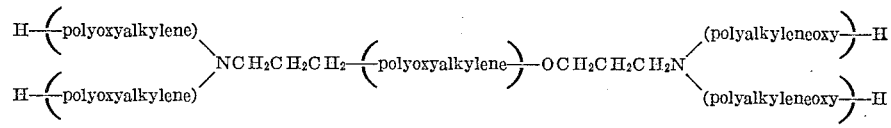

wherein the alkylene moieties thereof have from 2 to 4 carbon atoms, the said polyol having a hydroxyl number of from about 35 to about 250.

References Cited by the Examiner

UNITED STATES PATENTS

| | | | |
|---|---|---|---|
| 2,187,823 | 1/1940 | Ulrich et al. | |
| 2,902,478 | 9/1959 | Anderson | 200—209 |
| 3,018,281 | 1/1962 | Crecelius | 200—209 |
| 3,036,020 | 5/1962 | Britain | 200—2.5 |
| 3,037,946 | 6/1962 | Guest et al. | 200—2.5 |

CHARLES B. PARKER, *Primary Examiner.*

LEON J. BERCOVITZ, *Examiner.*

DONALD E. CZAJA, ANTON H. SUTTO,
*Assistant Examiners.*